US007817982B1

(12) United States Patent
Chu et al.

(10) Patent No.: US 7,817,982 B1
(45) Date of Patent: Oct. 19, 2010

(54) SYSTEM FOR IDENTIFYING NON-IMPACTED AND POTENTIALLY DISASTER IMPACTED PEOPLE AND COMMUNICATING WITH THEM TO GATHER IMPACTED STATUS

(75) Inventors: Christopher Chu, Lakewood, CO (US); Brijen Doshi, Thornton, CO (US); Frederick C. Neff, Brighton, CO (US); D. Michael Overmyer, Golden, CO (US); Dongliang Wang, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 910 days.

(21) Appl. No.: 11/480,244

(22) Filed: Jun. 30, 2006

(51) Int. Cl.
*H04M 11/04* (2006.01)

(52) U.S. Cl. ................. 455/404.1; 455/404.2; 455/521; 455/456.1; 455/452.2; 379/45

(58) Field of Classification Search ... 455/404.1–404.2, 455/521; 379/45
See application file for complete search history.

(56) References Cited

U.S. PATENT DOCUMENTS 3,848,193 A * 11/1974 Martin et al. ............... 455/526
5,121,430 A * 6/1992 Ganzer et al. ............... 380/258
5,398,277 A * 3/1995 Martin et al. ................. 379/39
5,596,652 A 1/1997 Piatek et al.
5,793,882 A 8/1998 Piatek et al.
5,910,763 A * 6/1999 Flanagan ............... 340/286.02
6,529,722 B1 * 3/2003 Heinrich et al. .......... 455/404.1
6,574,561 B2 * 6/2003 Alexander et al. ............. 702/5
6,690,932 B1 * 2/2004 Barnier et al. ........... 455/414.1
6,721,553 B2 * 4/2004 Yoshioka ................ 455/404.1
6,721,580 B1 * 4/2004 Moon ......................... 455/574
6,745,021 B1 * 6/2004 Stevens ................... 455/404.1
6,761,312 B2 7/2004 Piatek et al.
6,868,340 B2 3/2005 Alexander et al.
6,993,118 B2 * 1/2006 Antonucci et al. ............ 379/45
7,034,747 B1 4/2006 Walters et al.
7,149,533 B2 * 12/2006 Laird et al. .............. 455/456.3
7,184,744 B1 * 2/2007 Schnabel ................. 455/404.2
7,233,781 B2 * 6/2007 Hunter et al. ............ 455/404.1
7,324,804 B2 * 1/2008 Hrastar et al. ............... 455/410
7,343,148 B1 * 3/2008 O'Neil .................... 455/404.2

(Continued)

FOREIGN PATENT DOCUMENTS

EP 00849693 6/1998

(Continued)

OTHER PUBLICATIONS

"Reverse 911. Warn Thousands. Anytime. Anywhere" available at http://www.r911.com, site updated Dec. 11, 2005, 1 page.
"AlertFind™—Emergency Notification & Escalation System" available at http://www.messageone.com/crisis-communications/how-it-works, site updated Jan. 13, 2006, pp. 1-2.

(Continued)

*Primary Examiner*—Sharad Rampuria
(74) *Attorney, Agent, or Firm*—Sheridan Ross P.C.

(57) ABSTRACT

The present invention provides methods and systems for determining the status and/or extent of damage caused by a disaster. More specifically, a disaster status system (DSS) is used to create a backup communication network, in the event that the primary communication network has been damaged, to locate and/or contact users that may be in or around a disaster-affected area.

24 Claims, 5 Drawing Sheets

U.S. PATENT DOCUMENTS

| | | | | |
|---|---|---|---|---|
| 7,412,225 | B2 * | 8/2008 | Islam et al. | 455/404.1 |
| 7,515,041 | B2 * | 4/2009 | Eisold et al. | 340/506 |
| 7,515,900 | B2 * | 4/2009 | Van Camp | 455/404.2 |
| 2002/0077137 | A1 * | 6/2002 | Akhteruzzaman et al. | 455/521 |
| 2003/0162557 | A1 | 8/2003 | Shida | |
| 2004/0029558 | A1 * | 2/2004 | Liu | 455/404.2 |
| 2004/0102178 | A1 * | 5/2004 | Williams | 455/404.1 |
| 2005/0003797 | A1 * | 1/2005 | Baldwin | 455/404.1 |
| 2005/0148317 | A1 | 7/2005 | Amano et al. | |
| 2005/0187677 | A1 * | 8/2005 | Walker | 701/16 |
| 2006/0223494 | A1 * | 10/2006 | Chmaytelli et al. | 455/404.2 |
| 2007/0202844 | A1 * | 8/2007 | Wilson et al. | 455/404.2 |
| 2007/0218868 | A1 * | 9/2007 | Schefczik et al. | 455/404.1 |
| 2007/0298758 | A1 * | 12/2007 | Verma et al. | 455/404.1 |

FOREIGN PATENT DOCUMENTS

| | | |
|---|---|---|
| WO | 9819282 | 5/1998 |
| WO | 2004084532 | 9/2004 |

OTHER PUBLICATIONS

"R.E.D. Alert Features" available at http://www.redalertsystem.com/, site updated Dec. 23, 2005, pp. 1-2.

"Communicate better, faster, and more reliably with the 3n mass notification system" available at http://www.3nonline.com, site updated Jan. 5, 2006, pp. 1-2.

"Emergency Alert System—Call Thousands of Households in Minutes", available at http://www.911broadcast.com, site updated Jan. 6, 2006, pp. 1-2.

Ladin "GIS-Enabled Disaster Notification", available at http://www.geointelmag.com/geointelligence/article/articleDetail.jsp?id=211117&&pageID=2, Nov. 1, 2005, pp. 1-2.

"Using the GPS for People Tracking" available at http://www.travelbygps.com/articles/tracking.php, Revised: Jan. 10, 2006, pp. 1-5.

"Hurricane Katrina "I'm OK" Registry" available at http://katrina.im-ok.org, Jan. 10, 2006, pp. 1-3.

"Eyes on Katrina—I'm OK Line" available at http://eyesonkatrina.blogspot.com/2005/08/im-ok-line.html, dated Aug. 30, 2005, pp. 1-21.

* cited by examiner

SYSTEM FOR IDENTIFYING NON-IMPACTED AND POTENTIALLY DISASTER IMPACTED PEOPLE AND COMMUNICATING WITH THEM TO GATHER IMPACTED STATUS

FIELD OF THE INVENTION

The invention relates generally to communication systems. More particularly, the invention relates to disaster status determination methods and systems.

BACKGROUND

In emergency management, as in other time sensitive activities, timely and accurate information is vital for use in allocating resources as well as achieving other emergency management priorities such as field assessment and analysis. Clearly, in the hours immediately following a disaster there is an urgent need for accurate information to manage the relief effort. As used herein, a disaster includes natural disasters such as hurricanes, fires, earthquakes or famine or man-made disasters such as war or terrorism. When such disasters occur, the scope of the damage is generally geographically dispersed and may affect vast numbers of people and extensive damage to infrastructure. However, some disasters may be localized to smaller areas or structures. In the time period immediately following the disaster, local resources such as police, fire protection and heath care are often inadequate to respond to all of the problems related to the disaster, especially when the extent of damage is widely dispersed. Often, outside resources are required to supplement local resources and, since the disaster may be geographically widespread, it is often difficult to determine how best to allocate these outside resources. Moreover, the status of potential victims within the disaster-affected area is difficult to determine.

When a disaster occurs, it is common practice to establish an Emergency Management Center (EMC) in the area hit by the disaster to collect information regarding the damage and manage the allocation of outside resources. When the disaster is widespread, such as occurs after a hurricane or earthquake, several EMCs are established throughout the region so coordinating the aid requests and efficiently allocating resources becomes a major and complicated task. These EMCs must communicate with established EMCs operated by local, state and federal agencies tasked to deal with such disasters. In addition to the EMC, individuals affected by the disaster may need to acquire information regarding their relatives or personal possessions such as a house or boat located in the disaster area.

Often, however, any information that arrives at the EMC is anecdotal, resulting in improper allocation of scarce resources. Indeed, after a major disaster a period of days may pass before a clear picture of the extent and level of damage begins to form at the EMC. In the meantime, crucial decisions on resource allocation are made with only limited information. During the time period immediately following the disaster, individuals may clog the telephone network and harass officials at the EMC and elsewhere for information relating to their personal concerns. There is a great need to determine and provide timely and accurate information to individuals in an automatic manner so that EMC officials are free to concentrate on coordinating disaster relief.

Unfortunately, the EMC that often sends in the first resource requests is the area least affected by disaster while EMCs located in geographical areas with heavy damage are typically overwhelmed and slow to assess the damage, as the emergency response personnel are occupied responding to immediate lifesaving tasks. Many times EMCs in heavily damaged areas are simply unable to determine what resources are required. Often the damage to the infrastructure, such as by way of example, highways, power transmission grids, communication lines, water supply, condition of medical facilities, public buildings, etc., is so heavily damaged that it is difficult to even establish communication between EMCs to request assistance. Without accurate and timely information, there is a high risk of improperly allocating scarce resources.

When a large hurricane makes landfall, by way of illustrative example, up to forty-eight hours may pass before areas hard hit by the storm are able to re-establish communications. During this period there may be little accurate information available to the EMC as to the extent of the damage, or the exact resources that are required. Because of this information void at the central EMC during the period immediately following the disaster, it is difficult to provide adequate resources in a timely manner. To overcome the information void, Federal Emergency Management Association (FEMA) agents use portable information and communication devices, such as the GSC100 manufactured by Magellan, Inc., to relay information from established emergency locations to the EMC. This vital information, sent via a satellite communication system, includes the functional status of hospitals, the extent of property damage, the state of communications networks, and the condition of other infrastructure in the area affected by the disaster. Thus, the remote emergency centers are able to immediately begin collecting damage information through observation. The agents are able to observe downed bridges, blocked roads, destroyed buildings and numerous other items vital to accurate field assessment and analysis.

A problem with relying on FEMA agents to provide status information is that they must first be placed in the disaster-affected area before they can begin reporting the extent of the damage caused by the disaster. The delays in receiving reports of status may be serious, especially when decisions regarding the allocation of scarce resources must be made almost immediately after the disaster strikes. It would be much quicker and more efficient to contact someone who was in the area when the disaster occurred and is still in the area. Unfortunately, because primary communication networks may be either incapacitated by the disaster or jammed due to increased usage, contacting someone within a disaster-affected area is not an easy task.

SUMMARY

These and other needs are addressed by various embodiments and configurations of the present invention. The present invention is directed generally to a system for determining the status of an area after a disaster has occurred. More specifically, backup communication networks may be generated and employed to contact users within a disaster-affected area.

In accordance with one embodiment of the present invention, a method is provided for responding to a disaster. The method comprises the steps of:

(a) identifying an area affected by a disaster;

(b) generating a backup communication network for at least a portion of the affected area in response to the disaster;

(c) locating locally impacted users that are in and/or adjacent to the affected area; and (d) attempting to contact the located impacted users via the backup communication network to gather status information.

Users that are contacted via the backup communication network may include public officials that have been given a communication device that is capable of communicating via the backup network, subscribers that have a similar communication device, or non-subscribers that are still reachable via the backup communication network.

The normal/primary network generally provides 2-way voice communication between endpoints in the system. In accordance with one embodiment, the backup network serves a second function of providing the ability to see where the user's device is from a central location. Another function of the backup network is that is provides communication capabilities between the impacted user and the central location. When the backup network is operational, it is mainly used for the location and communication purposes. To simplify the recovery effort, impacted users are generally not allowed to call out to other people or the central system via the backup network. Rather, their communication device must be spotted and can be called by the central system. In a non-disaster situation, a user would not need the location and communication functions of the backup network.

Likewise, in the disaster-impacted areas, if the primary voice network is still operational, then there may be no need to enable impacted people the ability to call someone else or the central system via the back up network because the call volume cannot be fairly estimated with a great amount of accuracy.

In accordance with one embodiment, having the ability to spot devices in an impacted area includes additional functions. One function is the ability to use GPS to determine device location information on earth and by way of radio signals, transmit the location information to be displayed within viewable disaster impacted areas at the central system. If the land-element of the GPS network is corrupted, portables must be brought in to reestablish part of this network. On the other hand, the 2-way radio network for transmitting location information to the central system can be built dynamically in response to the disaster.

In one embodiment, the radio network can also be used to establish 1-way communications between the user's device and the central system. Once a connection is established, the owner of the device can respond to various prompts received from the central system. Thus, in addition to the normal voice communication functionality, the user's device may have a GPS function to locate itself and 2-way radio functions to allow it to (i) transmit the location information to be displayed within GPS perspective and (ii) allow it to be called or otherwise communicate with the central system. In one embodiment, the backup communication network is generated to provide communication capabilities with the communication devices that may be in the affected area. After a disaster has occurred, the communication devices are likely incapable of communicating via the primary communication network because some or all of the communication network has been destroyed or otherwise damaged. The backup communication network may have been placed around potential areas that have a high likelihood of being struck by a disaster (e.g., gulf coast cities that may be struck by hurricanes, mid-west cities that may be struck by tornadoes, west-coast cities that may be struck by earthquakes, or high profile buildings and cities that may be struck by terrorist activities). The backup communication network may be placed or otherwise deployed such that it will not be incapacitated by a disaster that may threaten the primary network. For example, if the primary communication network is mainly above ground, then the backup communication network may be deployed underground or vice versa. In general, the backup communication network provides communication and locator abilities for the affected area; the central system subsequently connects the impacted and non-impacted areas by collecting status information of people in the impacted area via the backup network and providing this information to others in the non-impacted area via the primary network.

In accordance with an alternative embodiment, the backup communication network is generated in response to the occurrence of a disaster. For example, radio signal transceivers that are generally employed on the ground may be adapted for mobilization. In other words, a radio signal transceiver, similar to transceivers used in connection with cellular phone towers or the like, may be deployed on a truck, helicopter, or other type of movable object. The mobile radio signal transceiver can then be used to communicate with users in and around an area where the primary communication network has failed.

The backup communication system, in accordance with one embodiment, is used to contact users that were in an area when the disaster occurred. The users are contacted for several reasons. A first reason for contacting a user is to determine if they are okay or to determine what type of assistance they require (i.e., medical, search and rescue, or the like). A second reason is to ask the user about the status of the affected area surround him/her. The status information collected from one or many users can be employed by an EMC to generate a more accurate picture of the disaster-affected area soon after a disaster has occurred.

In addition, the communication from the central system to different sets of impacted users can be designed differently based on anticipated level of crisis the users may be going through. For example, users who are surrounded by water should be talked to differently from those who are clearly on land but do not have ability to call out or may be trapped under building collapses. Multiple automated sample dialogs from the central system to impacted users can go out at the same time and the responses can be heard and addressed by different recovery teams also at the same time. Most systems that employ disaster response technologies today only allow one dialog to be run at a time but not simultaneously to multiple lists of users as described. It should be noted that a user's location can become well-known once the backup network becomes operational and thus effort can be focused on other important aspects of emergency response like calming down users, generating response teams, and scheduling pickups of users.

In accordance with one embodiment of the present invention, some users within an affected area may be able to check-in and report their status with a predetermined location. These users that have already checked-in do not require another contact confirming their safety and asking for a description of the status of the affected area. The users that have not yet checked-in are those who should be contacted as a confirmation of safety. Thus, in accordance with at least one embodiment of the present invention, only users that have not checked-in are contacted via the backup network. This minimizes the number of people that need to be contacted and thus reduces the amount of network resources required to generate a status of the affected area. With backup communication resources mainly being employed for contacting users that have not checked-in, users who may be in trouble can be contacted more quickly, which may ultimately result in saving a life.

As used herein "area" is understood to mean any area or volume of space. More specifically, an affected area may include an area of land, a building, a floor within a building, a room within a building, a vehicle, or other type of structure that may be adversely affected by a disaster.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or data base(s), the invention is not limited to use with any particular type of communication system or configuration of system elements. Those skilled in the art will recognize that the disclosed techniques may be used in any communication application in which it is desirable to quickly and accurately generate status information as it relates to a disaster-affected area.

Figure 1:
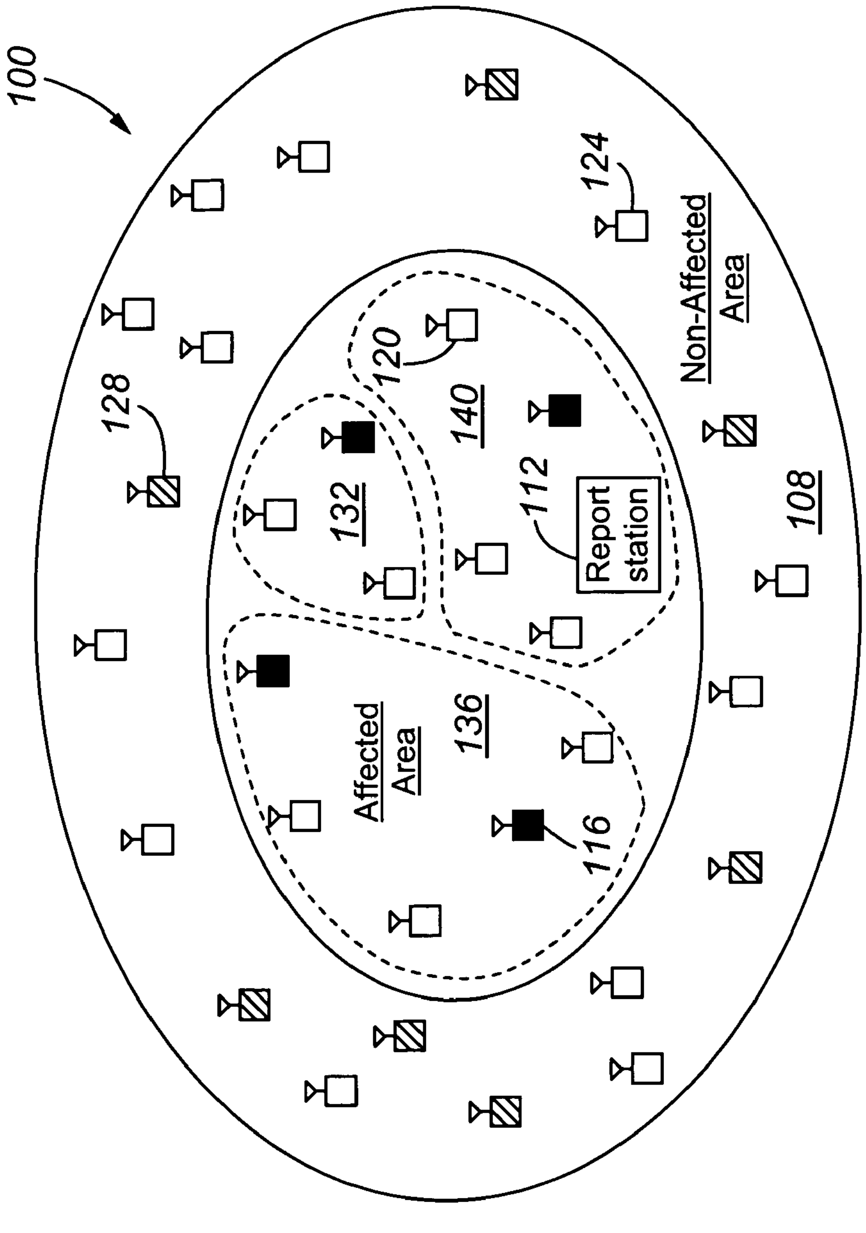
FIG. 1 is a block diagram depicting an affected area in accordance with embodiments of the present invention.

FIG. 1 illustrates a location 100 comprising an affected area 104 and an area adjacent to the affected area or a non-affected area 108 in accordance with at least some embodiments of the present invention. The affected area 104 may be divided into a number of different regions 132, 136, and 140, for example. Each region 132, 136, and 140 of the affected area 104 may have a different aspect from other regions. During the generation of messages to users in the affected area 104, messages may be customized for a particular region. In an alternative embodiment, messages may be customized for a particular user and his/her situation.

The location 100, in one embodiment, further comprises a report station 112 where people from the affected area 104 and/or the adjacent area may go to report their status. People may physically travel to the report station 112 or communicate their status to the report station 112 by some other mechanism (i.e., by word of mouth, on-line, by phone, or the like). Since people can voluntarily check-in at the report station 112, some users within the affected area 104 and/or the adjacent area may report their status before the system attempts to contact them. Users that have already checked-in at the report station are depicted as users 116, whereas users that have not yet checked-in are depicted as users 120. Users within the non-affected area 108 are depicted as users 124 and/or 128. The users 124 may also be relatives or contacts of subscribing members in the affected area. The users 128 are individuals who are not contacts of people within the affected area 104. Generally speaking, subscribing members in the affected area 104 can be regarded as locally impacted users. The locally impacted users are individuals who were and still are in the affected area 104 and can either report a status of the affected area 104 or who need assistance.

Each subscribing locally-impacted user is equipped with a communication device that allows them to communicate via a backup communication network. Additionally, the location of each user can be identified through various mechanisms. For example, a user's communication device may be equipped with a Global Positioning System (GPS) receiver. The user's communication device may be located through known satellite triangulation techniques to within a few feet. Alternatively, the activity of a user's communication device may be detected by a cellular phone tower that is still working or by a backup transceiver that has been brought to the affected area 104. When a communication device is detected by one of these devices, the location of a user can be determined within a certain amount of granularity. Currently, cellular phone providers are required by the FCC to be able to identify the location of a cellular phone within 328 feet and most cellular phones can be located with a higher level of accuracy (i.e., within tens of feet). The location of a user is determined to create a priority list of users to contact. Users 120 that have been located in the affected area 104 and have not yet checked-in should be contacted before users in the non-affected area 108. Moreover, users who are known to be located in more treacherous or life threatening locations should be contacted before users who are known to be in safer locations, whether both users are in the affected area 104 or not.

In accordance with at least one embodiment, users in both the affected area 104 and adjacent area 108 are contacted to determine a status of the area. The status of the area is important to know so that decisions regarding the deployment of resources can be made for effectively and efficiently. Since users who were in the affected area 104 when the disaster occurred can be contacted, rather than sending people in to the affected area 104, status information can be obtained more quickly, resulting in quicker and possibly better decisions.

Figure 2:
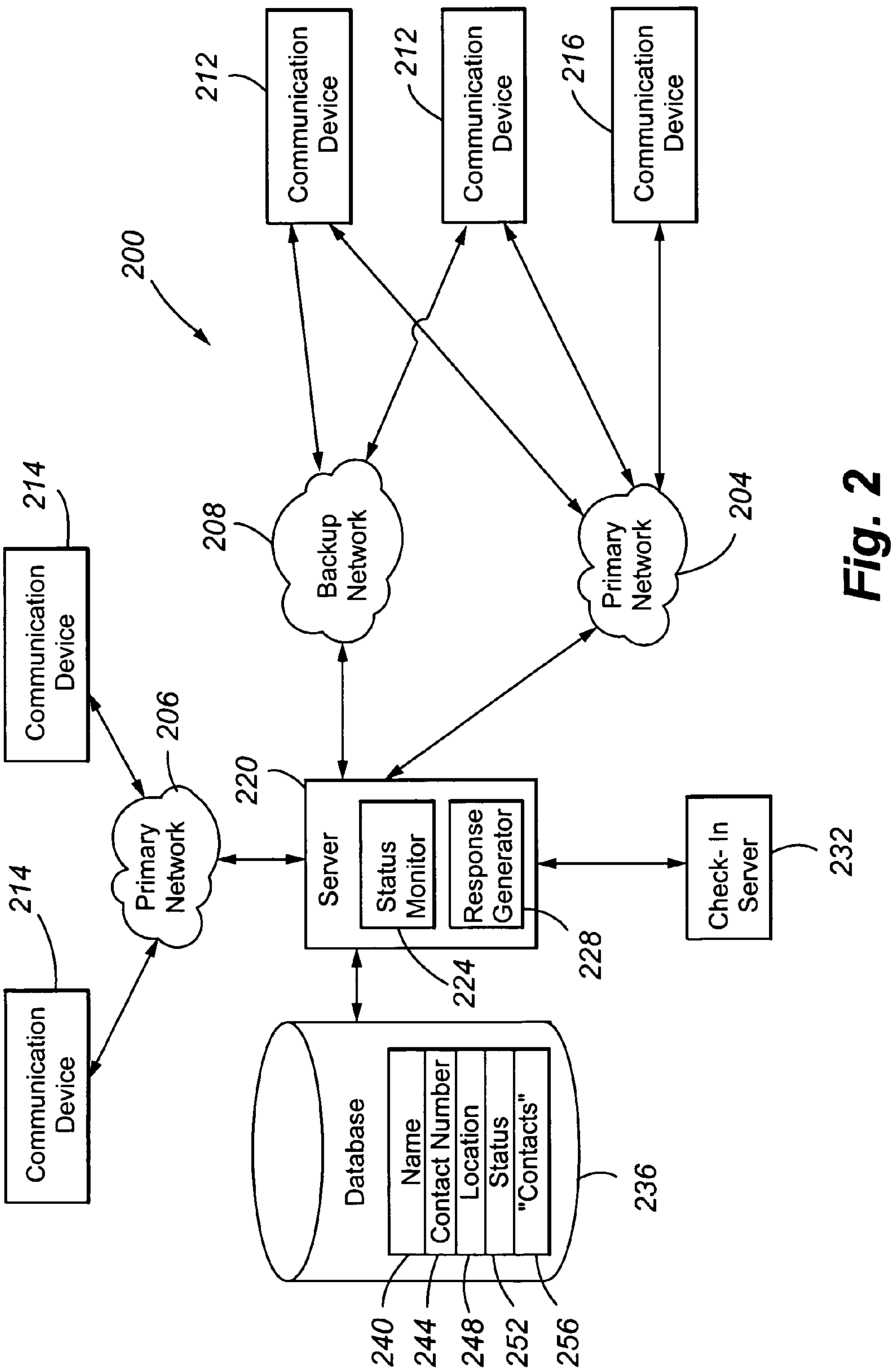
FIG. 2 is a block diagram depicting a communication system in accordance with embodiments of the present invention.

Referring now to FIG. 2, a communication system 200 will be described in accordance with at least some embodiments of the present invention. The communication system 200 generally comprises a primary communication network 204 and 206, a backup communication network 208, one or more communication devices 212, 214, and 216, a server 220 comprising a status monitor 224 and a response generator 228, a check-in server 232, and a database 236 operable to store information related to users of the communication system 200.

The primary network 204 and 206 may be any type of suitable communications network that is operable to transmit data from one communication endpoint to another endpoint, where typical endpoints include the communication devices 108, the server 220, and the like. Examples of suitable types of primary communication networks 204 include, but are not limited to, a standard Plain Old Telephone System (POTS), an Integrated Services Digital Network (ISDN), a Public Switched Telephone Network (PSTN), a Local Area Network (LAN), a Wide Area Network (WAN) like the Internet, a wireless network like a cellular network, and any other type of packet-switched or circuit-switched network known in the art.

The primary network 204 is a portion of the primary communication network that is affected or otherwise rendered temporarily useless by a disaster. When the primary network 204 is affected by a disaster, the non-subscribers using communication device 216 are not able to communicate with other users connected to the functioning portion of the primary network 206. Users that are able to communicate via the functioning primary network 206 with communication devices 214 are generally those users who are in the adjacent (i.e., the non-affected) area 108.

The backup communication network 208 may be a suitable communication network that employs wireless-based communications. Any suitable generation (e.g., 1G, 2G, 2.5G, 3G, 4G, etc.) of wireless technology may be employed to generate a backup communication network 208. For example, the backup communication network 208 may include, without limitation, Global System for Mobile (GSM) technologies, Short Message Systems (SMS) technologies, Time Division Multiple Access (TDMA) technologies, Code Division Multiple Access (CDMA) technologies, General Packet Radio Service (GPRS) technologies, and the like.

The communication devices 212, 214, and 216 can be any of a number of packet-switched or circuit-switched devices including, for instance, analog phone, digital phone, Personal Computer (PC), laptop, Personal Digital Assistant (PDA), IP hardphone, IP softphone, wireless phone, cellular phone, and networking equipment.

The first types of communication devices 212 are capable of communicating with the server 220 via the primary network 204 and via the backup network 208. The first types of communication devices 212 may belong to users that have subscribed to a particular service that allows them to communicate via the backup network 208. Alternatively, the first types of communication devices 212 may include the necessary hardware that allows the communication device 212 to connect to the backup network 208. The communication device 212 may be a half-duplex or a full-duplex device when communicating via the backup network 208. In other words, when the communication device 212 is a half-duplex device it sends and receives information to/from the backup network 208 on a single frequency. Therefore, only one party can transmit a message at a time. This type of functionality is similar to a walkie-talkie or CB radio. Alternatively, the communication device 212 may be a full-duplex device, in which case it sends and receives information on different frequencies. This allows the user of the communication device 212 to talk while the server 220 is sending a message to the user. The use of half-duplex devices may be advantageous to provide more communication bandwidth on the backup network 208 whereas full-duplex devices provide a higher level of service that may be desired during a disaster.

The second types of communication devices 216 are only capable of communicating with the server 220 via the primary network 204. In the event that the primary network 204 fails, the second type of communication device 216 will not be able to communicate with the server 220. The second types of communication devices 216 may be circuit-switched, packet-switched, or both, but are not configured to communicate via the backup network 208. Alternatively, the second types of communication devices 216 may be capable of communicating via the backup network 208, but will not be contacted by the server 220 because they are not associated with a user that has subscribed to the backup network 208

The server 220 is capable of communicating via the primary network 204, 206 and/or the backup network 208. The backup network 208 is primarily used as the communication network when the primary network 204 fails. Additionally, the server 220 provides a communication bridge between locally impacted users in the affected area 104 and their contacts in the non-affected area 108. The server connects to subscribing users' communication devices 212 via the backup network 208 and further connects to contacts of the locally impacted users via the functioning primary network 206.

The server comprises a status monitor 224 that is operable to locate the communication devices 212, 216 of users in and around the affected area 104. As previously mentioned, the location of users may be determined by a number of mechanisms including, without limitation, GPS and cellular phone locating techniques. Moreover, the status monitor 224 can identify the communication device 212, 216 that it has located and further determine what user is associated with the communication device 212, 216.

When the server 220 contacts a user, the status monitor 224 is further operable to receive information about the status of the area around the user and the status of the user. The status monitor 224 maintains a record of the status of the area with the information that it receives from each user as they are contacted.

The status monitor 224 is also capable of determining status information from the check-in server 232. The check-in server 232 may be located relatively close to the affected area 104 and people that were or are in the affected area may report their status to the status monitor 224 via the check-in server 232.

After the status monitor 224 has obtained a suitable status of the area, the server 220 may contact the communication devices 212, 216 to let them know what the status is and provide them with any additional instructions. The server 220 may also contact the communication devices 214 to provide an update of the status of a user in the affected area 104.

As the server 220 determines what user to contact, the response generator 228 identifies the status that the user previously reported to generate a personalized response for the user. The response generated by the response generator 228 may be personalized for the user based on his/her location, perceived health, available resources, action plan, and the like. For example, a user that has indicated they are hurt can be told to stay where they are and someone will be there to help them. The user may also be given instructions on how to treat or maintain their injury until help arrives (i.e., elevate the wound, instructions on how to create a tourniquet, how to create a splint, and so forth). Another user that has indicated they are okay but do not know where to go can be given directions out of the affected area by their personalized message.

In accordance with at least some embodiments of the present invention, a user may wish to speak with some other person, like a relative or loved one, while they are trapped or hurt. To accommodate this, the server 220 may determine if there is enough bandwidth available on the backup network 208 to connect the user to one of his/her desired contacts. If there is available bandwidth, the user may be connected with a contact via the functioning primary network 206 so that the affected user can tell his/her contact that they are okay personally, rather than having a recorded message tell their family members that they are okay.

The response generator 228 may also be capable of determining a disaster response plan that includes the deployment of various resources throughout the affected area 104. The response generator 228 is used to help determine what users should be contacted (based on who is already checked-in) and generates personalized responses for each locally impacted user.

The server 220 is in communication with the database 236 where information about the status of the affected area 104 and users is maintained. Specifically, the database 236 can be used to store user name information 240, contact number information 244, location information 248, user status information 252, and requested contacts 256. The server 220 can update and reference the information stored in the database 236 as it is generating status information for users and for the affected area 104.

The status field 252 can be used to store information about the status of the user and/or his requests. The status of a user can include whether they have checked-in or not and if they have checked-in, what their reported status is. Moreover, the status field 252 may include information about the status of the area surrounding the user.

A subscribing user may wish to list a number of contacts that he/she would like to either talk to in case of an emergency or have notified of their status in case of an emergency. In one embodiment, the contacts in the contacts field 256 may be informed, via a communication network other than the backup network 208, of the user's status as soon as it is known, even if there is no available bandwidth on the backup network 208 that would allow the user to communicate with his/her contacts. If there is bandwidth available on the backup network 208, or if the primary network 204 is functioning, the user may be connected to one or more of the contacts so that he/she may report his/her status to the contacts personally.

The term "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

It should be emphasized that the configuration of the server, user communication devices, and other elements as shown in FIGS. 1 and 2 is for purposes of illustration only and should not be construed as limiting the invention to any particular arrangement of elements.

Figure 3:
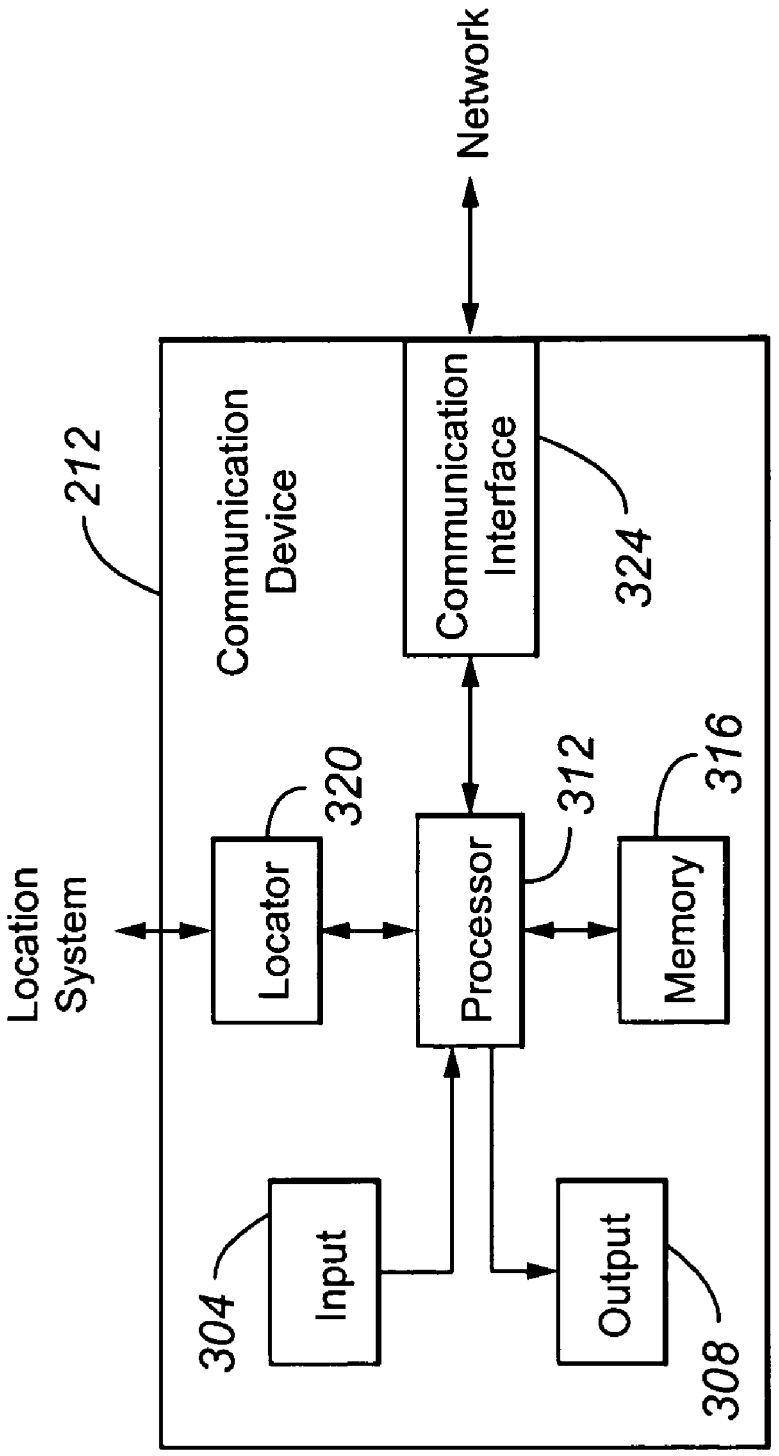
FIG. 3 is a block diagram depicting a communication device in accordance with embodiments of the present invention.

With reference now to FIG. 3, an exemplary communication device 212 will be described in accordance with at least one embodiment of the present invention. The depicted communication device 212 comprises a user input 304, an output device 308, a processor 312, a memory 316, a locator 320, and a communication interface 324. The communication device 212 may comprise the typical functionality of a plain old telephone or PC (i.e., the ability to send and receive contacts via the communication network 204, 208). More specifically, the communication device 212 is capable of connecting to the server 220 via the primary 204 or backup 208 networks.

The user input 304 may include, without limitation, a keyboard/keypad, a mouse or other type of pointing mechanism, a microphone or other type of voice transducer, and a video camera. The user input 304 functions to collect data from the user and transmit the received data to the processor 312. If the collected data is to be transmitted across one or both of the communication networks 204, 208, the processor 312 will package the information for transmission, if necessary, utilizing formatting information stored in memory 316 and forward the data on to the interface 324 for transmission across the communication network(s) 204, 208.

The output device 308 is operable to display information to the user. Data received at the interface 324 from the communication network(s) 204, 204 is transmitted to the processor 312, which subsequently undoes any transmission formatting that may have been present in the message. The processor 312 then forwards the data on to the output device 308 for presentation to the user. The displayed data may be audio, visual, live, recorded, streaming, static, or a combination thereof. The output device 308 may include, without limitation, a speaker, a Light Emitting Diode (LED) or collection of LEDs, an LCD display, a projection screen, a plasma screen, a beeper, or any other device capable of presenting data to a user of the communication device 212.

The processor 312 is capable of performing predetermined functions that may be stored in memory 316. The processor 312 controls the functionality of the communication device 212 and further processes incoming and outgoing data according to transmission protocols of the communication network(s) 204, 208. The processor 312 may be embodied as a microprocessor or similar type of processing chip. Alternatively, the processor 312 may include an Application Specific Integrated Circuit (ASIC), a programmable logic device (PLD), or a field programmable gate array (FPGA).

The memory 216 is operable to store functions for the processor 212 to execute along with other information including, phone extension information, caller identification information, and user information. The memory 216 may include volatile and/or non-volatile memory. Examples of a suitable type of memory 216 include, but are not limited to, Random Access Memory (RAM), Dynamic RAM (DRAM), Read Only Memory (ROM), Programmable ROM (PROM), Electronically Erasable PROM (EEPROM), buffered memory, Flash memory, and the like.

The locator 320, in one embodiment, is the device that allows the server 220 to determine the location of the communication device 212. The locator 320 may comprise a GPS receiver or similar type of location device known in the art. One example of a GPS receiving device is described in U.S. Pat. No. 7,034,747 to Walters et al, the entire disclosure of which is hereby incorporated herein by reference. The '747 patent describes a GPS system that is linkable to a wireless communication device.

The locator 320 may also be embodied as a part of the communication interface 324. As noted above, various cellular location techniques are known in the art in which the server 220 communicates with the communication device 212 via the interface 324 to determine the device's location. The communication device 212 may maintain its own location in memory 316 and intermittently or continuously transmit that location to the server 220. The server 220 receives the location of the communication device 212 and subsequently knows whether it is in the affected area 104, the adjacent area 108, or neither.

The interface 324 serves as the connection between the communication device 212 and the communication network(s) 204, 208. The form of the interface 324 may vary depending upon the type of communication network and communication device. The interface 324 may include a modulation/demodulation unit for modulating data to be sent across the communication network and demodulation data received from the communication network. The interface 324 may comprise, without limitation, a standard telephone interface, a modem, an Ethernet port and Ethernet card, a wireless interface, and so on. The protocols used to communicate with the communication network 204, 208 may include known wired and/or wireless communication protocols. As can be appreciated by one of skill in the art, the communication device 212 may comprise multiple communication interfaces, each of which is capable of communicating with a different communication network. Alternatively, in accordance with one embodiment, the communication device 212 may comprise a single communication interface 324 that allows the communication device 212 to communicate with multiple communication networks.

In one embodiment, the primary network 204 and the backup network 208 may be the same type of network that employs the same types of communication protocols. In another embodiment, backup network 208 is the primary network 204 reconfigured to function as backup network 208. In response to the primary network 204 being incapacitated, the backup network 208 is generated to provide continued communications with the communication devices 212, 216. There may be instances where only subscribing communication devices 212 are contacted by the server 220 or are allowed to use the backup network 208. The second types of communication devices 216 may still be capable of communicating via the backup network 208, even if they aren't allowed to for whatever reason (i.e., preservation of bandwidth, not paying for the backup network, and the like).

Figure 4:
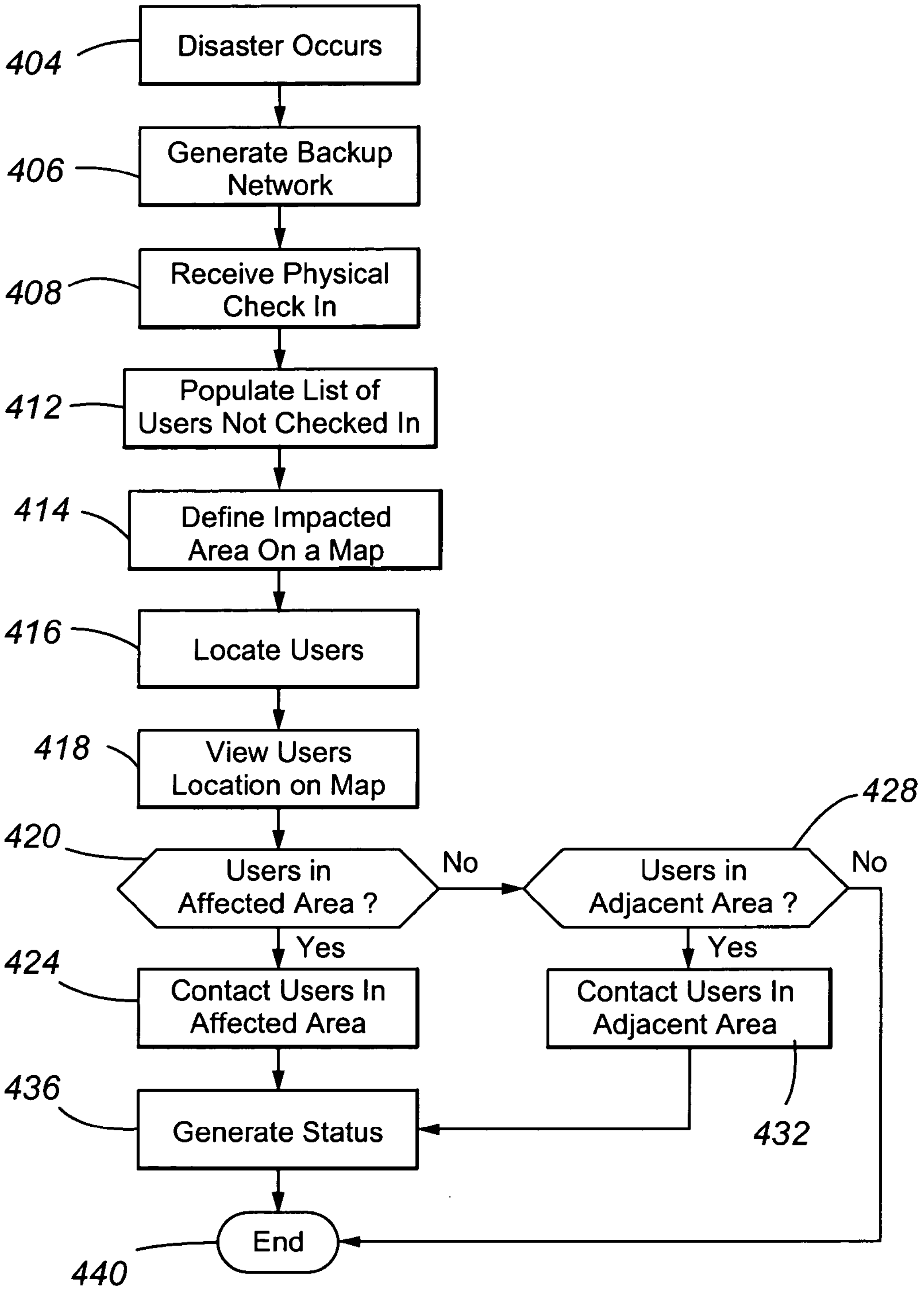
FIG. 4 is a flow chart illustrating a method for gathering information about a disaster-affected area in accordance with embodiments of the present invention.

Referring now to FIG. 4, a method of gathering disaster status information will be described in accordance with at least some embodiments of the present invention. The method begins when a disaster occurs (step 404). When a disaster occurs, a backup network is generated (step 406). This particular step may include fixing parts of the primary network that have been damaged, fixing/enabling portions of a GPS or other locating type system, bringing in equipment to generate the backup network and creating a central location for disaster response. Also in response to the occurrence of a disaster, one or more individuals may check-in with the report station 112 (step 408). The people that check in at the report station 112 may indicate their medical status as well as the status of any portion of the affected area that they saw or heard about.

In an attempt to minimize the number of users that are contacted, the server 220 populates a list of users that have not checked-in with the report station 112 (step 412). The list of users that have not checked-in may include both subscribers and non-subscribers. In one embodiment, the subscribers may be a priority for the server 220 to contact. Also, the server 220 may not be able to contact the non-subscribers in the event that the primary network 204 has become incapacitated and there is no other way of contacting the non-subscribers.

To determine what users or subscribers are locally impacted and what users or subscribers have not been locally impacted, a map is generated in the disaster response area depicting the location of users in both the affected area 104 and adjacent area 108 (step 414). This step may include dynamically updating the extent of the affected area 104 as additional status reports are received by locally impacted users and other users that have been placed in the affected area 104.

As users continue to check-in at the reporting station 112 or by some other voluntary measure, the list of non-checked-in users dynamically updates itself to reflect who should be contacted and who does not need to be contacted. The server 220 then determines the location of users (checked-in and/or non-checked-in), so that it can determine which users should be contacted first (step 416). Generally, users that are in the affected area 104 are contacted before users in the adjacent area 108. The location of a user may also be used in connection with the status information the user provides to create a more clear determination of the status of the affected area 104 and certain portions within the affected area 104. As users are located, their location can be displayed for viewing on the map in the central command station (step 418). The display of the user location may be displayed on a user display associated with the status monitor 224.

Another function that can be concurrently performed during the location of locally impacted users is the generation of an initial communication dialog/plan that can be transmitted to locally impacted users when they are contacted.

In step 420, it is determined if one or more non-checked-in users are in the affected area 104. In the event that a user (or users) are in the affected area 104, then the server 220 attempts to contact the users. The server 220 may not be able to contact all of the users on the first attempt, and will therefore continue trying to contact the users until they are contacted (step 424). The server 220 may determine after a number of attempts (i.e., twenty contact attempts) that the user may be injured and unable to work the communication device 112. In that instance the status for the user that was not contacted is assumed. Otherwise, the server 220 receives the status for each user and compiles each user's status with the overall status information for the affected area 104. As status information is updated, workers in the EMC become better equipped to determine how to allocate scarce resources to the affected area.

Once a user is contacted his/her name is removed from the list of users that have not checked-in. In one embodiment, contact with a subscriber may be required based on the agreement between the service provider and the subscriber. For example, the subscriber may have paid for this emergency service and is expecting to be contacted by the server 220. If the user is not contacted after a certain number of attempts, but the location of the user is known, resources may be allocated for the subscriber to ensure that he/she is okay or to save him/her from any danger they might be in.

If bandwidth is available while the users in the affected area 104 are contacted, the server 220 may determine what users (if any) are in the adjacent area 108 (step 428). In the event that no users are in the adjacent area 108, then the server 220 continues to allocate its resources to contacting the users in the affected area 104. In the event that there are users in the adjacent area 108, and there is bandwidth available to contact those users, the server 220 begins attempting to contact the users in the adjacent area 108 that have not yet checked-in (step 432). The users in the adjacent area 108 may be contacted to not only gain more status information about the extent of the affected area, but they may also be contacted and asked if they are willing to help people in the affected area 104. Resources in the adjacent area 108 may be staged for movement into the affected area 104, and users in the adjacent area 108 may be contacted and asked to mobilize those resources.

The server 220 continues to attempt contacting non-checked-in users in both the affected and non-affected areas, while generating status information as users are contacted (step 436). This process continues until either all users have been contacted or a suitable amount of status information has been retrieved, at which point the method ends (step 440). As can be appreciated, the method may continue to generate new status information as it becomes available and as additional users are contacted.

Figure 5:
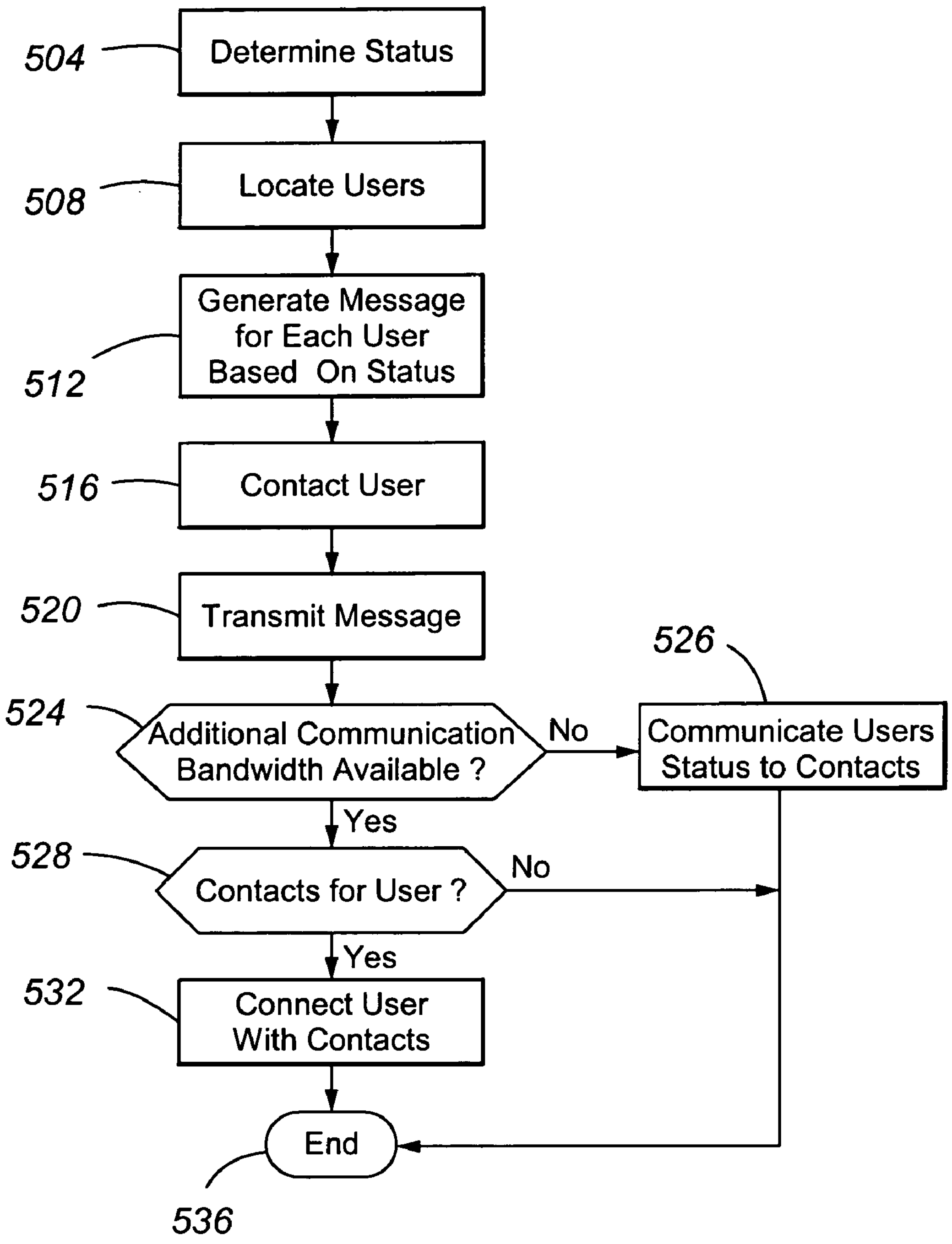
FIG. 5 is a flow chart illustrating a method of communicating with users in or around a disaster-affected area in accordance with embodiments of the present invention.

Referring now to FIG. 5 a method of communicating with users will be described in accordance with at least some embodiments of the present invention. The status of the affected area 104 is determined as the server 220 continues to contact users that had not previously checked-in (step 504). The status is used in part to determine how to allocate resources and also in part to determine content of messages to send to users. Once enough status information has been determined and the EMC has identified a course of action for handling the disaster the users are located (step 508). The users may be located based on their previous known location that is stored in the database 236. On the other hand, the users may be located again either by GPS or by other locating techniques. Based on the users location as determined in step 508, a message is generated for each user based on his/her status (step 512). A user's status may include the user's physical and mental health, age, gender, location, previously reported status (i.e., trapped, stuck, free to move, etc.), and the like. A first message may be generated for a first user that indicates the nearest shelter from harm and how to get there from the user's current location. A second message may be generated for a second user that tells him/her not to worry, that medical teams are en-route to their location and they will be there soon. Again, the content and how the message is delivered may vary from user to user. In one embodiment, a subscribing user may have previously indicated that he/she is in a wheel chair and cannot move very easily. In this situation, with the predefined criteria, the response generator 228 will know that the user will not be able to leave his/her location even if they are okay. Thus the message conveyed to the user may contain instructions on how to stay calm and safe. Each message that is generated for a different region of the affected area 104 may be simultaneously transmitted to locally impacted users in their respective area. In other words, one message may be transmitted to a first user in a first region whereas a second message may be transmitted to a second user in a second region at the same time. The first and second messages may each contain information specific to the region in which the user is. As a user moves between regions, the message to be transmitted for that particular user may change as well.

Battery life may also be of concern during a disaster. Therefore, the message generated for the user may direct the user to turn off the communication device 212 in an attempt to save batteries. The message may further indicate when it will contact the user again thereby letting the user know when to turn the communication device 212 back on.

Once the message for a user has been generated, the user is contacted (step 516). As can be appreciated, the server 220 may remember what communication network was used to contact the user, and can attempt to contact the user via the same network that was successfully used before. If the user is not contacted, the server 220 will continue trying to contact the user until a successful contact is established, or the user has indicated checked-in at a report station 112. Once a successful contact is established, the generated message is transmitted to the user (step 520).

The user may also have indicated contacts that he/she would like to speak with if possible during a disaster. Therefore, after the message is played for the user, it is determined if there is additional bandwidth available on the communication network that will allow the user to speak with his/her predefined contacts (step 524). In the event that there are additional users that need to be contacted and the full capacity of the network is currently being used, then it is determined that there is no communication bandwidth available for the user. At this point if at least some status of the user is known, that status may be indicated to contacts or relatives of the user via a separate communication (step 526). As can be appreciated by one of skill in the art, continuous communications with contacts of the locally-impacted user may be sent as new information is retrieved about either the impacted user and/or the region in which the locally impacted user is.

After the status of the locally impacted user has been transmitted to the user's predefined contacts, the method may end or wait to connect the user when adequate bandwidth becomes available. On the other hand, if additional bandwidth is available for use in contacting other users or no other users are left to contact, then the server determines if the currently contacted user has any people that he/she would like to speak with (step 528). In the event that there are no contacts defined in the database 236 for the user, then the method ends (step 536). However, if there are contacts that the user has indicated they would like to speak with, then the user is connected with one or more of the defined contacts (step 532). This allows the user to personally tell the predefined contacts that he/she what the status is and that he/she is okay (assuming the user is okay).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of responding to a disaster, comprising:

identifying an area affected by a disaster;

generating a backup communication network for at least a portion of the affected area in response to the disaster;

locating locally impacted users that are one of in and adjacent to the affected area; and attempting to contact the located locally impacted users via the backup communication network to gather status information for at least some of the locally impacted users, wherein a server determines an order for initiating contacts with the locally impacted users via the backup communication network based on the status of the locally impacted users, wherein, at least based on bandwidth availability, one or more locally impacted users are restricted from initiating a communication via the backup communication network.

2. The method of claim 1, wherein the status of a locally impacted user includes one or more of checked-in, non-checked-in, mental health information, location, and emergency situation, and wherein attempting further comprises:

determining, by the server, which of the located locally impacted users has been assigned a state of non-checked-in to report a status; and attempting to contact the locally impacted users that have not yet checked-in to report a status prior to initiating a communication to a locally impacted user that has checked-in.

3. The method of claim 1, wherein generating the backup communication network comprises:

equipping users with communication devices that are capable of communicating via the backup network prior to the occurrence of a disaster;

moving communication equipment proximate to the affected area; and connecting with the locally impacted user having the communication device via the communication equipment.

4. The method of claim 1, wherein the users are located by at least one of Global Positioning Systems (GPS) and cellular location techniques.

5. The method of claim 1, further comprising:

determining that a locally impacted user associated with the affected area has not been contacted;

continuing to attempt to contact the locally impacted user associated with the affected area until the user has been contacted; and after the locally impacted user associated with the affected area has been contacted, changing the status of the locally impacted user associated with the affected area to checked-in thereby changing a priority with which communications will be initiated from the server to the locally impacted user associated with the affected area.

6. The method of claim 1, further comprising:

contacting a locally impacted user in the affected area;

recovering affected area status information from the locally impacted user; and updating records of the status of the affected area with the status information provided by the locally impacted user.

7. The method of claim 1, further comprising:

compiling a status of the affected area from information received from a number of locally impacted users that have been contacted;

automatically generating a message at the server for a locally impacted user associated with the affected area, the automatically generated message including at least a part of the complied status of the affected area and further including instructions for responding to the disaster;

initiating contact, by the server, with the locally impacted user associated with the affected area via the backup communication network; and conveying, by the server, the message to the locally impacted user associated with the affected area.

8. The method of claim 7, wherein the message generated for the locally impacted user associated with the affected area is substantially unique to the locally impacted user and is based on the user's predefined preferences.

9. The method of claim 7, further comprising:

determining the backup communication network has sufficient bandwidth available to allow at least one locally impacted user to initiate a communication via the backup communication network;

determining the contacted locally impacted user has at least one contact that they would like to speak to;

initiating, by the server, a communication with the at least one contact on behalf of the locally impacted user;

connecting the server with the at least one contact; and thereafter, connecting the locally impacted user with the at least one contact via the server and the backup communication network.

10. A computer comprising physical memory that includes processor-executable instructions stored thereon which are operable to perform, when executed by a processor, the method of claim 1.

11. A system for responding to a disaster, comprising:

a plurality of communication devices each associated with a locally impacted user located proximate to an area affected by a disaster;

a server operable to identify the area affected by a disaster and locate at least some of the plurality of communication devices; and a backup communication network generated in response to a primary communication network being at least partially affected by the disaster, the backup communication network providing communication capabilities between the server and at least some of the plurality of communication devices, wherein the server determines an order for initiating contacts with the communication devices via the backup communication network based on a status of the users, wherein, at least based on bandwidth availability, one or more communication devices are restricted by the server from initiating a communication via the backup communication network.

12. The system of claim 10, wherein the server is further operable to determine which locally impacted users associated with the located communication devices have not yet checked-in to report a status and attempt to contact the locally impacted users that have not yet checked-in to report a status via the backup communication network.

13. The system of claim 11, wherein the server is further operable to continue attempts of contact via the backup communication network with the users that have not yet checked-in until the users are contacted, wherein the attempts of contact with the users that have not yet checked-in is performed before attempts of contact with user that have checked-in.

14. The system of claim 10, wherein the backup communication network comprises a mobile radio signal generator that is moved within proximity of the affected area and used to generate signals that can be utilized by the server to communicate with the at least one communication device.

15. The system of claim 10, further comprising a Global Positioning System (GPS), wherein at least some of the communication devices are equipped with a GPS receiver that can be used in connection with the GPS system by the server to substantially determine the location of the communication devices.

16. The system of claim 10, wherein the server is further operable to contact the locally impacted user, recover status information related to the affected area, and update records of the status of the affected area with the status information provided by the locally impacted user.

17. The system of claim 10, wherein the server is further operable to compile a status of the affected area from information received from a number of locally impacted users that have been contacted, automatically generate a message for a locally impacted user associated with the affected, the message including instructions for responding to the disaster that are specific to a known location of the locally impacted user and being one of a plurality of automated sample dialogs, the server being further operable to contact, via the backup communication network, the locally impacted user associated with the affected area, and convey the message to the locally impacted user associated with the affected area.

18. The system of claim 17, wherein the message generated for the locally impacted user associated with the affected area is substantially unique to the locally impacted user and is based on the user's predefined preferences.

19. The system of claim 17, wherein the server is further operable to determine the backup network has an adequate amount of bandwidth available to allow at least one locally impacted and contacted user who is not otherwise allowed to initiate communications via the backup communication network to initiate a communication via the backup communication network, determine the contacted locally impacted user has at least one contact that they would like to speak to, and connect the locally impacted user with the at least one contact via the backup network.

20. The system of claim 17, wherein the server is further operable to determine resources that should be employed in the disaster affected area based on the compiled status of the affected area.

21. A method of generating impacted area status, comprising:

identifying an area affected by a disaster;

generating a backup communication network for at least a portion of the affected area in response to the disaster;

contacting a locally impacted user via the backup communication network;

receiving information relating to the area affected by the disaster from the locally impacted user; and adding the locally impacted user to a list of contacted users, wherein locally impacted users on the list of contacted users are at least one of (i) at least based on bandwidth availability, restricted from initiating contacts via the backup communication network and (ii) subsequently contacted only after communication attempts with non-contacted users have failed.

22. The method of claim 21, further comprising:

generating an initial disaster response plan;

analyzing the received information from the locally impacted user; and updating the initial disaster response plan based on the information provided by the locally impacted user.

23. The method of claim 22, wherein the initial disaster response plan includes a predetermined communication that is transmitted to locally impacted users, and wherein the updated version of the disaster response plan includes a communication that differs from the predetermined communication.

24. The method of claim 23, wherein the communication of the updated version of the disaster response plan comprises a message to locally impacted users that is customized for the locally impacted user based on at least one of the user's location, user's status, and user's preferences, the method further comprising transmitting the updated version of the disaster response plan to the users on the list of contacted users at substantially the same time.

* * * * *